July 23, 1968     C. G. MATSON     3,393,762
VEHICLE GUIDANCE SYSTEM
Filed July 26, 1966
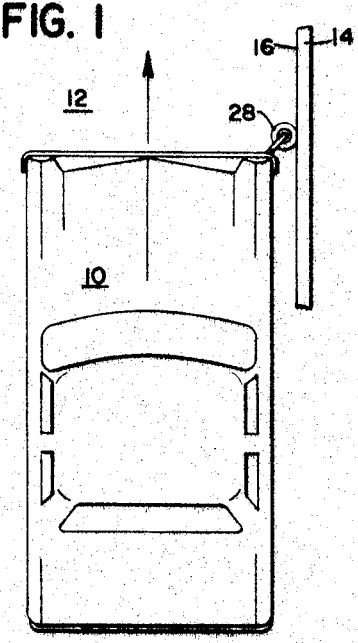
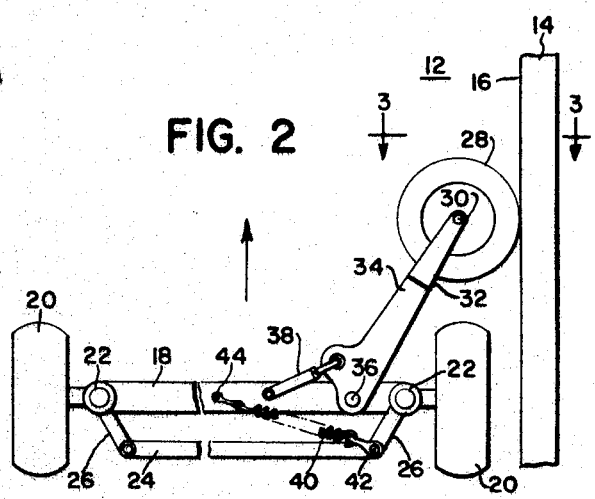
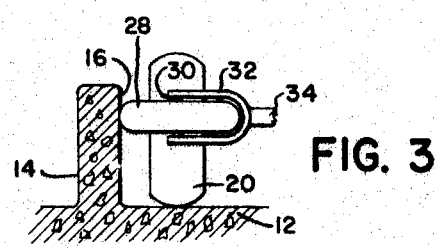
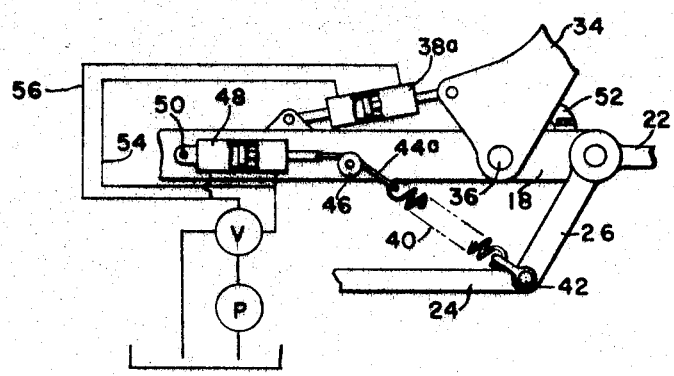
*INVENTOR.*
CARL G. MATSON

United States Patent Office 3,393,762
Patented July 23, 1968

3,393,762
VEHICLE GUIDANCE SYSTEM
Carl G. Matson, 401 E. Central Blvd.,
Kewanee, Ill. 61443
Filed July 26, 1966, Ser. No. 567,952
7 Claims. (Cl. 180—79)

ABSTRACT OF THE DISCLOSURE

A vehicle guidance system in which the vehicle is adapted to physically follow a single track or curb, the vehicle steering system being biased toward the curb and a curb following being used to react against the curb in opposition to the bias so that the vehicle follows the curb regardless of the configuration of the curve as to straight-ahead, right or left curves etc.

---

This invention relates to a vehicle guidance system and more particularly to a system employing a track, rail or the like paralleling a roadway and positive non-power means having no linkage with the vehicle steering mechanism but effective to cause the vehicle to follow the track element.

Known vehicle guidance systems designed for highway use with automobiles and the like rely on servo mechanisms requiring a power input, having the characteristic that if the power fails the system ceases to operate and if the power input is at all erratic the system becomes hazardous.

It is a principal object of the present invention to provide an improved and simplified guidance system requiring no power or servo mechanism and no direct linkage to the vehicle steering mechanism. It is a further object to exploit the caster characteristics of the conventional automotive steering mechanism to cause the vehicle to follow a track incorporated in the roadway over which the vehicle travels, together with means for biasing the steering mechanism in such manner as to cause the steerable vehicle wheels to steer slightly laterally toward the track which presents a reaction surface against which a vehicle-carried follower rolls. It is a still further object to provide operator-controllable means for selectively removing the biasing force from the steering mechanism and for retracting the follower from engageability with the track. A still further object resides in the adaptability of the system to existing vehicles with but minor alterations. Further, the roadway part of the system is so designed that it may be relatively easily crossed by vehicles as in emergencies.

The foregoing and other important objects and desirable features, inherent in and encompassed by the invention, will become apparent as preferred embodiments thereof are disclosed, by way of examples, in the following description and accompanying drawing, the several figures of which are described below.

FIGURE 1 is a plan view, somewhat schematic, giving an over-all view of the system.

FIGURE 2 is a fragmentary enlarged view illustrating the system in greater detail.

FIGURE 3 is a section on the line 3—3 of FIGURE 2.

FIGURE 4 is an enlarged fragmentary view showing one form of control means for parts of the system.

In its simplest form, the inventive system may be applied to a conventional four-wheel (or more) vehicle 10 as shown in FIGURE 1, traveling forwardly in the direction of the arrow over a roadway 12 into which is built a track element 14, here in the form of an integrated curb or rail of concrete or like material presenting a generally upright track surface 16 paralleling the roadway. The curb is preferably erected along the roadway at the driver's right; although, its specific location as well as its form could be otherwise. The surface 16 is preferably upright so as to remove vertical force components, but it is obvious that other surface configurations could be used, such as channel V, etc.

The vehicle is here shown as being equipped with conventional front wheel structure including a transverse front axle 18 and a pair of laterally spaced front steerable wheels 20 carried by the axle by means of steering knuckles 22 and steered by typical steering mechanism including a tie rod 24 and steering arms 26. Being of typical automotive construction, the steering mechanism incorporates therein the usual caster characteristics, one feature of which is, of course, that the wheels 20 tend to travel straight ahead.

The vehicle is modified to the extent that it carries track follower means, here including a circular member or guide wheel 28 journaled at 30 on a vertical axis to roll along the curb surface 16. The journal at 30 is effected by the yoked outer end 32 of a support arm 34 having its inner end pivotally connected at 36 to a right-hand part of the axle 18. A brace 38 extends between the axle and the arm to rigidify the arm against lateral movement. Thus, forces received in reaction by the guide wheel 28 from the curb wall or surface 16 are transmitted directly to the axle 18 and not by way of any linkage etc. to any part of the mechanism that steers the front wheels 20, as is the case in some known systems (e.g., agricultural tractor guides).

The last component of the system is means for biasing the vehicle wheels to steer toward the curb. Representative of such means in FIGURE 2 is a tension spring 40, anchored at one end at 42 to the right-hand steering arm 26 and at its other end at 44 to the axle 18. The force exerted by this spring may be relatively light, sufficient to exert the proper lateral force to cause the guide wheel 28 to follow the curb but light enough to be overcome by the driver (especially if the vehicle has power steering) should he desire to steer to the left, as when overtaking and passing another vehicle. The connections at 42–44 are preferably made releasable so that the spring 40 may be removed as for conventional driving. Likewise, the brace 38 is in the form of a turnbuckle or the like and is therefore selectively extendible and retractible so that the arm may be retracted to the left when when not in use.

When the system is in use, the lateral reactive force in the arm 34 counters the opposing biasing force exerted by the spring 40, causing the vehicle to be steered by a combination of the steering mechanism caster and the curb-following effect of the guide wheel 28.

FIGURE 4 illustrates a representative means, available to the driver at the wheel of the car, for adding and removing bias from the steering mechanism and for extending and retracting the guide wheel arm 34.

The brace 38 is replaced by a two-way fluid motor 38a. The axle end of the spring 40 is connected to a cable 44a which passes over a sheave 46 and is connected to the piston rod of a second two-way fluid motor 48, the cylinder of which is anchored to the axle 18 at 50. A pump P supplies fluid under pressure to a valve V which has two positions other than neutral, in one of which it retracts the motor 48 to tension the spring 40 while simultaneously extending the motor 38a to extend the arm 34 against a stop 52 on the axle, which stop determines the outermost position of the arm so that the guide wheel 28 will engage the curb 14. The fluid line connecting the motors 48 and 38a in parallel for the above joint purposes is designated 54. Another fluid line 56 connects the opposite ends of these motors in parallel to the valve for simultaneously retracting the motor 38a (to retract the arm 34) and extending the motor 48 (to relax the spring 40). Obviously, the valve V or any suitable remote control therefore would be located on the vehicle instrument panel. Other types of controls could also be used on the basis of what is disclosed here. Other alterations could be resorted to, such as placing the curb laterally offset to the left and biasing the steerable wheels to the left etc., using two curbs and two alternately usable guide wheels 28 etch., all of which is attainable without departing from the spirit and scope of the invention.

Because of the simplicity of the invention, it can be easily used with distance-maintaining, speed control and other highway systems. The height of the curb 14 is such that it is normally effective to guide vehicles, yet it is low enough to allow a vehicle to be easily lifted over it by simple tow truck facilities in the event of emergencies etc.

What is claimed is:

1. A vehicle guidance system including a vehicle having a frame, steerable wheel means and manually controllable steering mechanism therefor and a roadway over which the vehicle is adapted to travel, characterized in that the roadway includes a single roadway-paralleling track element presenting a generally upright reaction surface, the vehicle frame includes a track follower mounted thereon independently of the steering mechanism and steerable wheel means for following said reaction surface, and the vehicle further includes frame-carried means for biasing the steerable wheel means laterally toward said reaction surface to cause said follower to follow said surface.

2. The invention defined in claim 1, in which the track element lies along the path to be traveled by the vehicle but is laterally offset beyond the vehicle, and the track follower includes a circular member rotatable on a generally upright axis and adapted to roll along said surface, and laterally substantially rigid support means carried by the vehicle adjacent to the steerable wheel means and extending laterally therefrom and journaling the circular member.

3. The invention defined in claim 1, including operator-controllable means for selectively relieving the lateral bias on the steerable wheel means.

4. The invention defined in claim 1, including operator-controllable means for selectively retracting the follower from engagement with the track.

5. The invention defined in claim 1, including operator-controllable means for selectively relieving the lateral bias on the steerable wheel means and for retracting the follower from engagement with the track.

6. A vehicle guidance system including a vehicle having a frame and a front wheel steering mechanism including laterally spaced apart steerable wheels incorporating usual caster characteristics and a roadway over which the vehicle is adapted to travel, characterized in that the roadway includes a single roadway-paralleling track element presenting a generally upright reaction surface, the vehicle includes biasing means acting on the steering mechanism to cause the vehicle wheels to steer toward said reaction surface, and the vehicle frame further includes a track follower engageable with said surface and connected to the vehicle frame independently of the steering mechanism to exert a lateral reaction force against the vehicle frame opposite to the force of the biasing means and acting directly on the vehicle frame and independently of the steering mechanism so as to exploit the caster characteristics of the steering mechanism to compel the vehicle to follow said track element.

7. The invention defined in claim 6, including means for selectively deactivating the biasing means.

References Cited

UNITED STATES PATENTS

| 1,602,066 | 10/1926 | Burton | 180—79 XR |
| 1,793,288 | 2/1931 | Martin | 104—245 |
| 2,109,403 | 2/1938 | Roussy et al. | 104—60 |
| 3,119,349 | 1/1964 | Hampton et al. | 104—243 |

FOREIGN PATENTS

| 1,082,511 | 3/1960 | Germany. |

BENJAMIN HERSH, *Primary Examiner.*

L. D. MORRIS, JR., *Assistant Examiner.*